United States Patent
Kang

(10) Patent No.: US 11,328,127 B2
(45) Date of Patent: May 10, 2022

(54) APPARATUS AND METHOD FOR PROVIDING SHARED CONTENTS BASED ON EMOTICON GRAMMAR FOR NLP ON OPEN USER PARTICIPATION PLATFORM FOR AI ANSWER DICTIONARY AND DATA SET PREPROCESSING

(71) Applicant: Pil Sung Kang, Seoul (KR)

(72) Inventor: Pil Sung Kang, Seoul (KR)

(*) Notice: Subject to any disclaimer, the term of this patent is extended or adjusted under 35 U.S.C. 154(b) by 0 days.

(21) Appl. No.: 16/815,796

(22) Filed: Mar. 11, 2020

(65) Prior Publication Data

US 2021/0209308 A1 Jul. 8, 2021

(30) Foreign Application Priority Data

Jan. 7, 2020 (KR) .................. 10-2020-0001766

(51) Int. Cl.
  *G06F 3/048* (2013.01)
  *G06F 40/30* (2020.01)
  *G06F 40/58* (2020.01)
  *G06F 40/117* (2020.01)
  *G06F 3/04817* (2022.01)
  (Continued)

(52) U.S. Cl.
  CPC .......... *G06F 40/30* (2020.01); *G06F 3/0482* (2013.01); *G06F 3/04817* (2013.01); *G06F 40/117* (2020.01); *G06F 40/169* (2020.01); *G06F 40/56* (2020.01); *G06F 40/58* (2020.01); *G06F 3/0236* (2013.01); *G06F 2203/011* (2013.01); *G06Q 50/01* (2013.01); *G06Q 50/10* (2013.01)

(58) Field of Classification Search
  CPC ........ G06F 40/30; G06F 3/0482; G06F 40/58; G06F 3/04817; G06F 40/117; G06F 40/56; G06F 40/169; G06F 3/0236; G06F 2203/011; G06Q 50/01; G06Q 50/10
  USPC .............................................. 704/3
  See application file for complete search history.

(56) References Cited

U.S. PATENT DOCUMENTS

| | | | |
|---|---|---|---|
| 10,788,900 B1* | 9/2020 | Brendel | .............. G06F 3/04817 |
| 2010/0088616 A1* | 4/2010 | Park | ........................ H04L 51/04 |
| | | | 715/762 |

(Continued)

FOREIGN PATENT DOCUMENTS

| | | |
|---|---|---|
| KR | 10-2010-0048688 A | 5/2010 |
| KR | 10-2016-0080958 A | 7/2016 |

(Continued)

OTHER PUBLICATIONS

An Office Action mailed by the Korean Intellectual Property Office dated Feb. 24, 2021, which corresponds to Korean Patent Application No. 10-2020-0001766 and is related to U.S. Appl. No. 16/815,796.

*Primary Examiner* — Dino Kujundzic
*Assistant Examiner* — Jianmei F Duckworth
(74) *Attorney, Agent, or Firm* — Studebaker & Brackett PC

(57) ABSTRACT

Disclosed is an apparatus automatically generating and providing shared contents through a sentence matched based on an emoticon grammar. The apparatus receives a selection input for a predetermined number of emoticon grammars, of which the number is limited to a predetermined number, from a user terminal to receive a selection input for a predetermined number of a plurality of quotation sentences matched with an analyzed intent of a user, analyzes the intent of the user based on the received emoticon grammar.

10 Claims, 11 Drawing Sheets

(51) Int. Cl.
*G06F 3/0482* (2013.01)
*G06F 40/56* (2020.01)
*G06F 40/169* (2020.01)
G06F 3/023 (2006.01)
G06Q 50/00 (2012.01)
G06Q 50/10 (2012.01)

(56) References Cited

U.S. PATENT DOCUMENTS

| | | | |
|---|---|---|---|
| 2010/0179991 A1* | 7/2010 | Lorch | H04L 51/063 |
| | | | 709/206 |
| 2017/0075878 A1* | 3/2017 | Jon | H04M 1/72436 |
| 2017/0131870 A1* | 5/2017 | Harper | G06F 3/04817 |
| 2018/0260385 A1* | 9/2018 | Fan | G06F 40/274 |
| 2018/0373683 A1* | 12/2018 | Hullette | G06F 40/134 |
| 2019/0295537 A1* | 9/2019 | Sapugay | G06N 5/025 |
| 2020/0104316 A1* | 4/2020 | Dimson | G06F 16/5838 |
| 2021/0152501 A1* | 5/2021 | Rai | G06F 40/205 |

FOREIGN PATENT DOCUMENTS

| | | |
|---|---|---|
| KR | 10-2017-0050325 A | 5/2017 |
| KR | 10-2018-0080987 A | 7/2018 |
| KR | 10-1976841 B1 | 5/2019 |

* cited by examiner

APPARATUS AND METHOD FOR PROVIDING SHARED CONTENTS BASED ON EMOTICON GRAMMAR FOR NLP ON OPEN USER PARTICIPATION PLATFORM FOR AI ANSWER DICTIONARY AND DATA SET PREPROCESSING

CROSS-REFERENCE TO RELATED APPLICATIONS

A claim for priority under 35 U.S.C. § 119 is made to Korean Patent Application No. 10-2020-0001766 filed Jan. 7, 2020 in the Korean Intellectual Property Office, the entire contents of which are hereby incorporated by reference.

BACKGROUND

Embodiments of the inventive concept described herein relate to an apparatus and method for providing shared contents based on an open user participation platform for artificial intelligence (AI) answer dictionary and data set preprocessing, and more particularly, relate to an apparatus and method for automatically generating and providing shared contents through a sentence matched based on the limited number of emoticon grammars for natural language processing and interpretation.

In general, various social network services (SNS) operate as a network that allows a user to establish a relationship with other users and to maintain and manage the relationship.

In addition, the SNS provides a communication function that exchanges comments or messages between users. Moreover, the communication between users on SNS may be made publicly, semi-publicly, or personally.

Such the SNS has a structure in which rapidity is emphasized in that a specific user writes the content and then shares the written content with unspecified individuals at the same time when the specific user presses a share button. Furthermore, the SNS has a structure in which interactivity that expresses emotions with immediate feedback and response is emphasized.

However, in the related art, emotions or personal information of users have been indiscriminately collected and disclosed to unspecified individuals, and thus the problem of malicious comments may not be solved due to the structure of the immediate feedback.

SUMMARY

Embodiments of the inventive concept provide a shared content providing apparatus and method that may simply transmit emotional expressions by expressing and providing the emotion of the user, which is expressed as a natural language, as the limited number of emoticon grammars for natural language processing and interpretation, may analyze an emoticon grammar selected by a user, provide and select an optimal quotation sentence corresponding to the emotion of a user, and may generate and provide shared contents.

According to an exemplary embodiment, an apparatus automatically generating and providing shared contents through a sentence matched based on an emoticon grammar for natural language processing and interpretation includes a communication module transmitting or receiving data with a user terminal, a memory storing a program for generating and providing the shared contents, and a processor executing the program stored in the memory. The processor is configured to receive a selection input for a predetermined number of emoticon grammars, of which the number is limited to a predetermined number, from the user terminal through the communication module to receive a selection input for a predetermined number of a plurality of quotation sentences matched with an analyzed intent of a user, as executing the program, to analyze the intent of the user based on the received emoticon grammar, to match a plurality of quotation sentences depending on the analyzed intent of the user, to tag the selected and input emoticon grammar with a quotation sentence to generate shared contents, and to provide the generated shared contents to the user terminal.

According to an exemplary embodiment, a method of automatically generating and providing shared contents through a sentence matched based on an emoticon grammar for natural language processing and interpretation and performed by a shared content providing apparatus includes receiving a selection input for a predetermined number of emoticon grammars, of which a number is limited to a predetermined number, from a user terminal, analyzing an intent of a user based on the received emoticon grammar, matching a plurality of quotation sentences depending on the analyzed intent of the user, receiving a selection input for a predetermined number of the plurality of quotation sentences, tagging the selected and input emoticon grammar with a quotation sentence to generate shared contents, and providing the generated shared contents to the user terminal.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
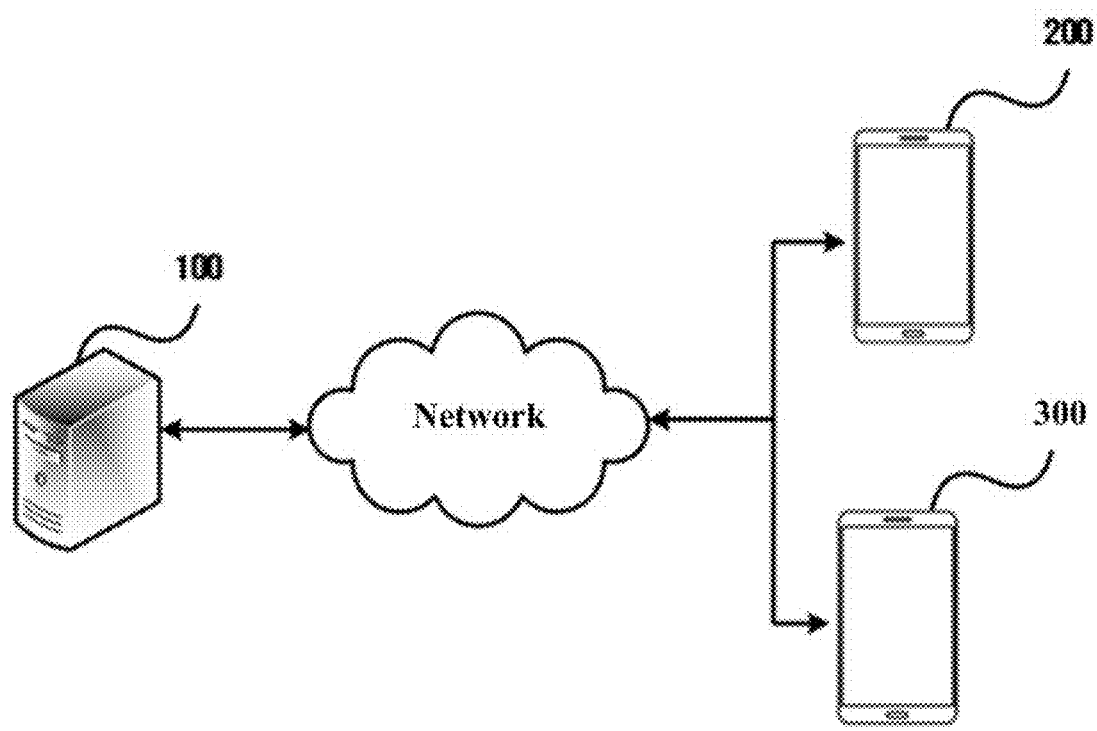
FIG. 1 is a view for schematically describing a shared content providing system, according to an exemplary embodiment of the inventive concept.

The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept are provided to make the disclosure of the inventive concept complete and fully inform those skilled in the art to which the inventive concept pertains of the scope of the inventive concept.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements. Throughout the specification, the same reference numerals dente the same elements, and "and/or" includes the respective elements and all combinations of the elements. Although "first", "second" and the like are used to describe various elements, the elements are not limited by the terms. The terms are used simply to distinguish one element from other elements. Accordingly, it is apparent that a first element mentioned in the following may be a second element without departing from the spirit of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, exemplary embodiments of the inventive concept will be described in detail with reference to the accompanying drawings.

The inventive concept refers to an apparatus and method (hereinafter referred to as a "shared content providing apparatus and method") based on shared contents based on the emoticon grammar for natural language processing on an open user participation platform for AI answer dictionary and data set preprocessing. Hereinafter, an exemplary embodiment of the inventive concept will be described in detail with reference to the accompanying drawings.

FIG. 1 is a view for schematically describing a shared content providing system, according to an exemplary embodiment of the inventive concept.

The shared content providing system according to an exemplary embodiment of the inventive concept includes a shared content providing apparatus 100 and a plurality of user terminals 200 and 300.

The shared content providing apparatus 100 provides the user terminal 200 with the limited number of emoticon grammars (hereinafter referred to as an "emoticon grammar") for natural language processing and interpretation. Moreover, the shared content providing apparatus 100 provides quotation sentences matched with the emoticon grammar selectively received from the user terminal 200 and generates and provides the shared contents based on the quotation sentences.

For example, the shared contents generated in an exemplary embodiment of the inventive concept may be a user's diary, but are not necessarily limited thereto.

At this time, an exemplary embodiment of the inventive concept allows a user to tag emoticon grammars and quotation sentences by receiving a selection input for the emoticon grammars and the quotation sentences. Furthermore, when there is a free sentence written by a user, it is possible to tag the free sentence with the emoticon grammar and to store the tagged result in a database.

Unlike the conventional SNS in which rapid sharing is emphasized, according to an exemplary embodiment of the inventive concept, a plurality of unspecified users having the same or similar emoticon grammar are found, and then the shared contents are shared with the unspecified users, through this manner That is, in the inventive concept, the difference is present in that delay is emphasized.

Furthermore, in an exemplary embodiment of the inventive concept, emotion-based communication is possible, not information-based communication, in that the solution for users with similar emotions and situations is shared.

Also, the SNS mostly has a structure which has interactivity and in which emotions are expressed through immediate feedbacks and responses, and thus always involves the problem of malicious comments. On the other hand, in an exemplary embodiment of the inventive concept, the shared content is unidirectional.

Furthermore, in an exemplary embodiment of the inventive concept, when providing a quotation sentence to the user terminals 200 and 300, the shared content providing apparatus 100 primarily uses the quotation sentence from the media passed by the deliberations in each country and then filters out problematic issues among users to passes the quotation sentence to other users. That is, there is a difference with the related art in that texts of immediate emotional release between users may be blocked in advance.

Moreover, a device with AI such as the conventional auto-responsive chatbots indiscriminately receives all the words of the user and analyzes the words in units of morphemes to identify the user's intent; the device collects and utilizes the analyzed result as learning data. The device has a problem of indiscriminately collecting information such as sound recording of all the voices in everyday life. In addition, in the case of using user conversation data, when a user participation open AI is created, a filtering process needs to be always involved.

For example, in 2016, Microsoft (MS) introduced AI chatbot Tay, which has a talk with people. Tay is MS's experimental project that allows a computer to understand the language of a human, created by the development team of AI experts and comedians playing comic chat.

The MS's development team has mined relevant public data, deleted personal information, entered the relevant public data into chatbot Tay; the MS's development team has learned the method of talking with people based on the public data and then has opened chatbot Tay to the public.

However, within 16 hours of launch, Chatbot Tay was shut down. The reason is that users of anonymous bulletin boards, where white supremacists and female Muslim haters are gathered, have brainwashed the chatbot to make swearwords, racist remarks, provocative political remarks, and the like.

As such, the conventional chatbot with AI indiscriminately collects and learns all the words of a user. Accordingly, an additional process of filtering out inappropriate terms needs to be accompanied.

On the other hand, the problem in the case of MS's Chatbot Tay may be solved in that inappropriate expressions may be completely controlled even though an exemplary embodiment of the inventive concept is based on open user participation.

Moreover, in an exemplary embodiment of the inventive concept, it may be seen that the primary encryption is completed in that the user's intent is abbreviated and processed to the limited number of emoticon grammars (e.g., limited to 30 sheets). Accordingly, it is possible to block, in advance, the concern that personal information is analyzed indiscriminately. This emoticon grammar may be considered as the most restrictive intent expressions, and thus unnecessary words, junk words and information may be prevented from being used in advance.

In addition, the problem of personal information leakage may be solved in that contents such as quotation sentences matched with the analyzed intent of a user are used for sentences that have passed the deliberation in each country.

In the meantime, an exemplary embodiment is exemplified in FIG. 1 as the shared content providing apparatus 100 is a single server in FIG. 1, but is not limited thereto. That is, it is obvious that the corresponding function is provided through a plurality of programs in a single server; a server composed of pieces of hardware may be implemented in the form in which the server is implemented with an independent server computer and is operated.

A user utilizing the user terminals 200 and 300 may generate the shared contents through the pre-installed application.

That is, when the user selects the predetermined number of a plurality of limited emoticon grammars provided through the application, the user receives a plurality of quotation sentences from the shared content providing apparatus 100. When the user selects the predetermined number of quotation sentences again, the user may receive the shared contents generated from the shared content providing apparatus 100 through the application.

Moreover, the generated shared contents may be shared with the plurality of the user terminals 200 and 300, the range of the user terminals 200 and 300, which is shared depending on whether the user selects an emoticon grammar or quotation sentence, may be varied.

In the meantime, the user terminals 200 and 300 may be intelligent terminals having computer support functions such as Internet communication and information search and may be mobile phones, smartphones, pads, smart watches, wearable terminals, other mobile communication terminal, and the like, which are capable of installing and executing a plurality of application programs (i.e., applications) desired by the user.

Hereinafter, in the description, for convenience of description, a terminal that generates the shared contents is referred to as the user terminal (200); a terminal that receives the shared contents generated by the user terminal 200 is referred to as the other user terminal 300. In fact, in an exemplary embodiment, it is obvious that the user terminal 200 may receive the shared contents generated by the other user terminal 300.

Figure 2:
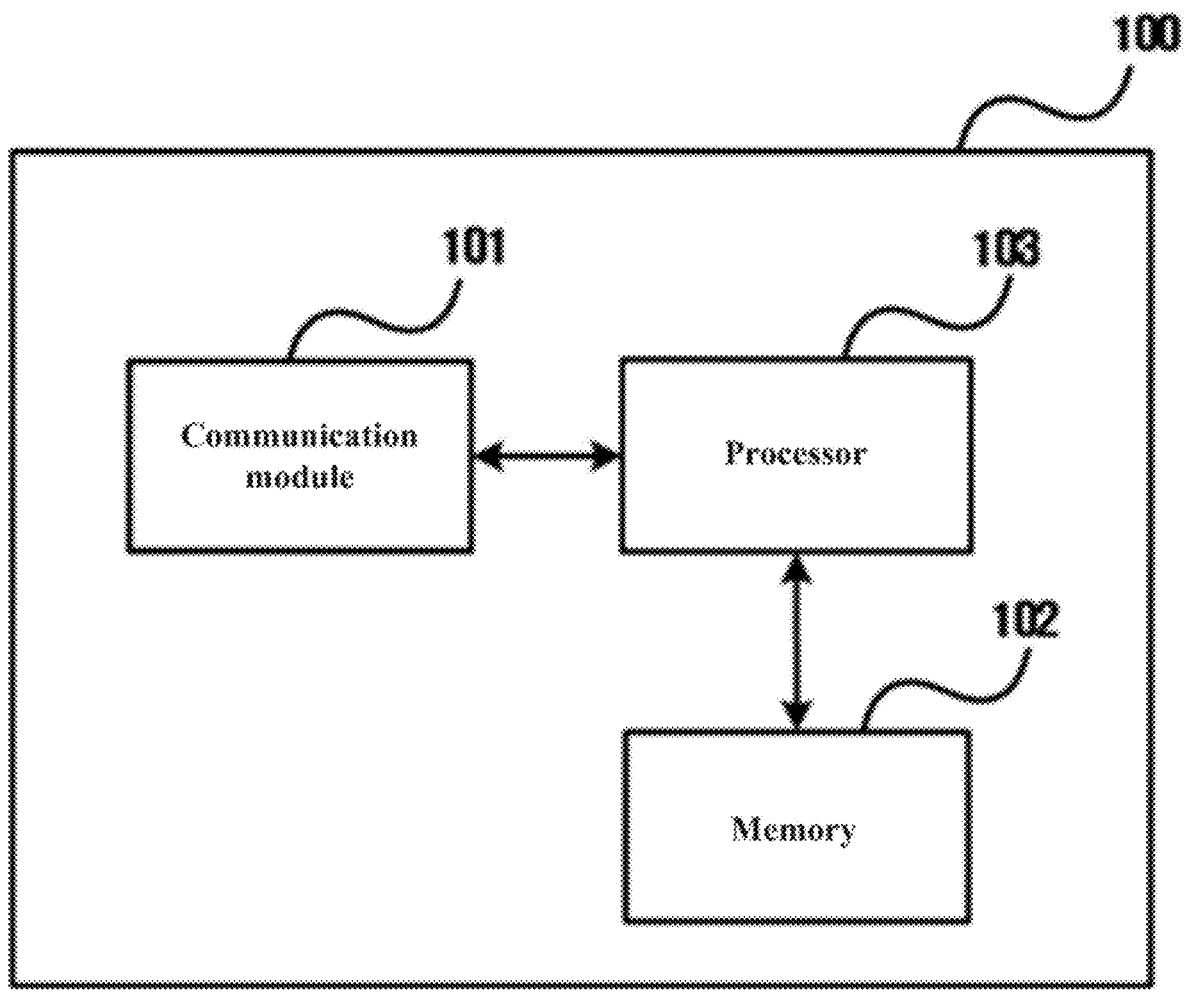
FIG. 2 is a block diagram of a shared content providing apparatus, according to an exemplary embodiment of the inventive concept.

FIG. 2 is a block diagram of the shared content providing apparatus 100, according to an exemplary embodiment of the inventive concept.

According to an exemplary embodiment of the inventive concept, the shared content providing apparatus 100 includes a communication module 101, a memory 102, and a processor 103.

The communication module 101 exchanges data with the user terminals 200 and 300.

The memory 102 stores programs for creating and providing shared contents; the processor 103 executes a program stored in the memory 102.

Figure 3:
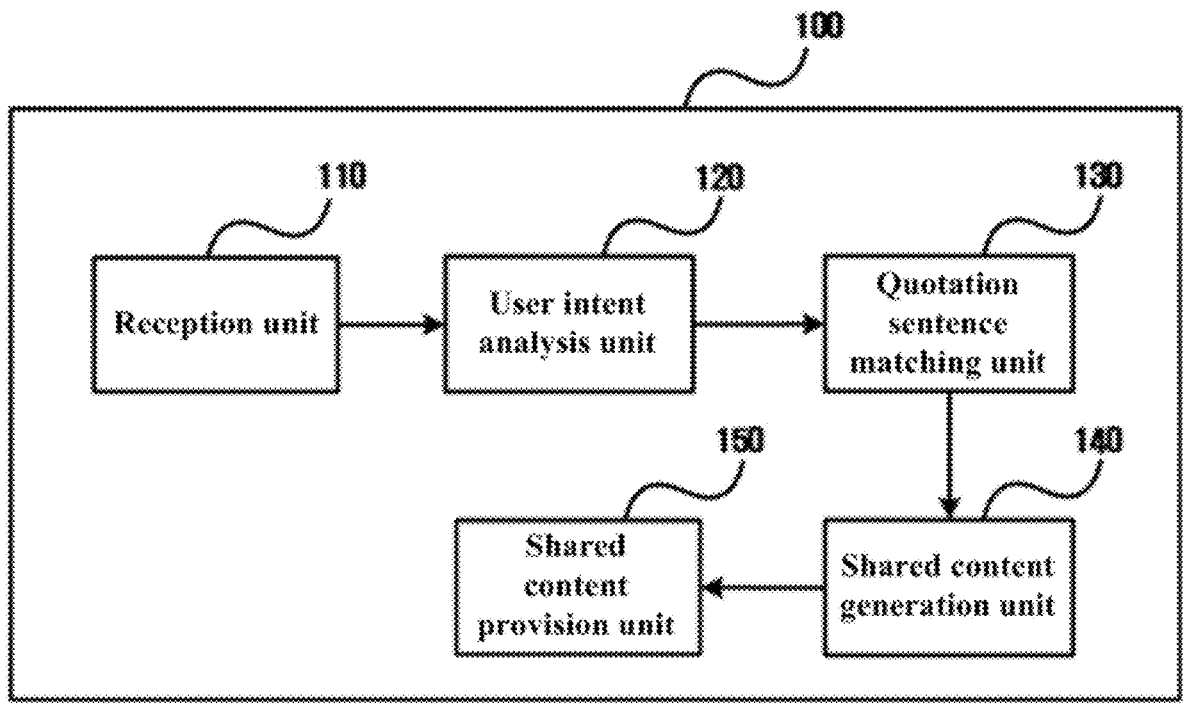
FIG. 3 is a block diagram of a shared content providing apparatus, according to an exemplary embodiment of the inventive concept.

FIG. 3 is a block diagram for schematically describing the function of the shared content providing apparatus 100, according to an exemplary embodiment of the inventive concept.

FIG. 3 is a diagram for describing the function executed by the configuration illustrated in FIG. 2; according to an exemplary embodiment of the inventive concept, the shared content providing apparatus 100 includes a reception unit 110, a user intent analysis unit 120, an quotation sentence matching unit 130, a shared content generation unit 140, and a shared content provision unit 150.

The reception unit 110 receives a selection input for the predetermined number of emoticon grammars among emoticon grammars, of which the number is limited to the predetermined number, from the user terminal 200.

Figure 4A:
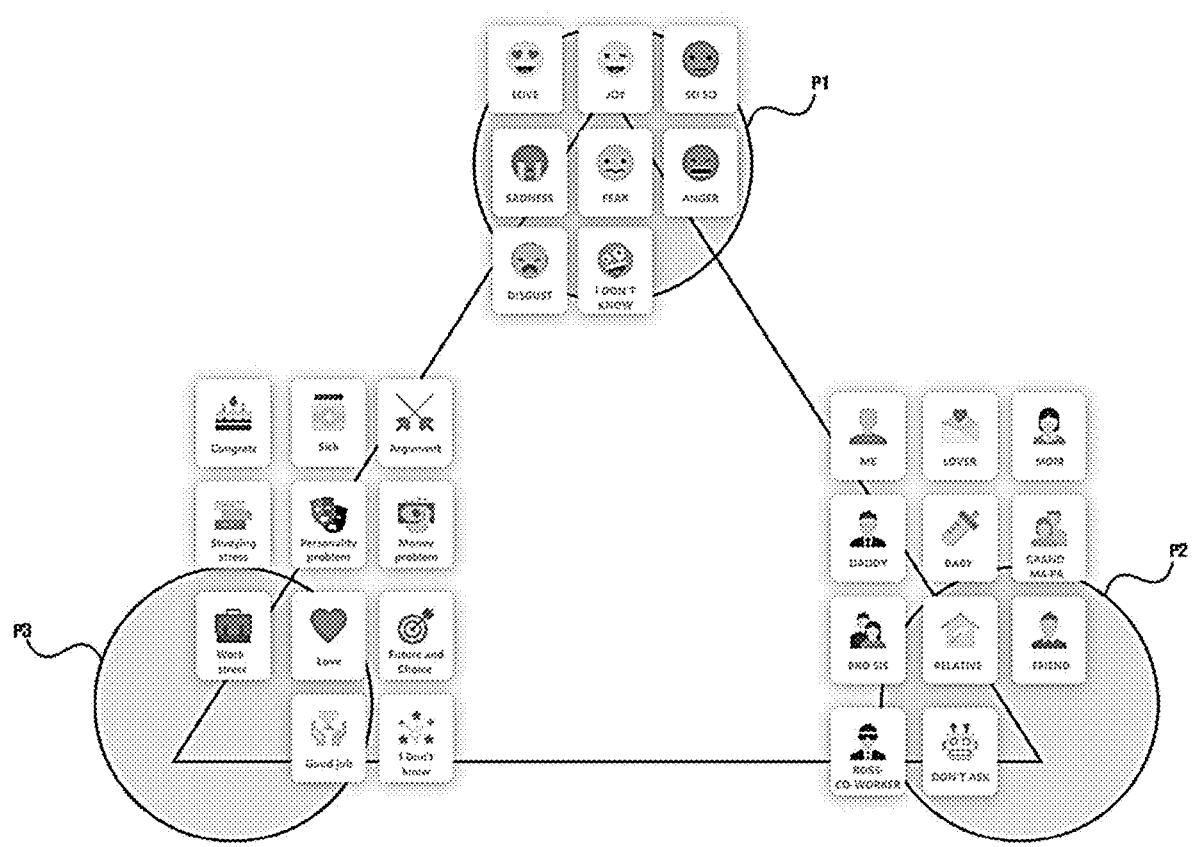
FIG. 4A is a view for describing a combination of emoticon grammars.
Figure 4B:
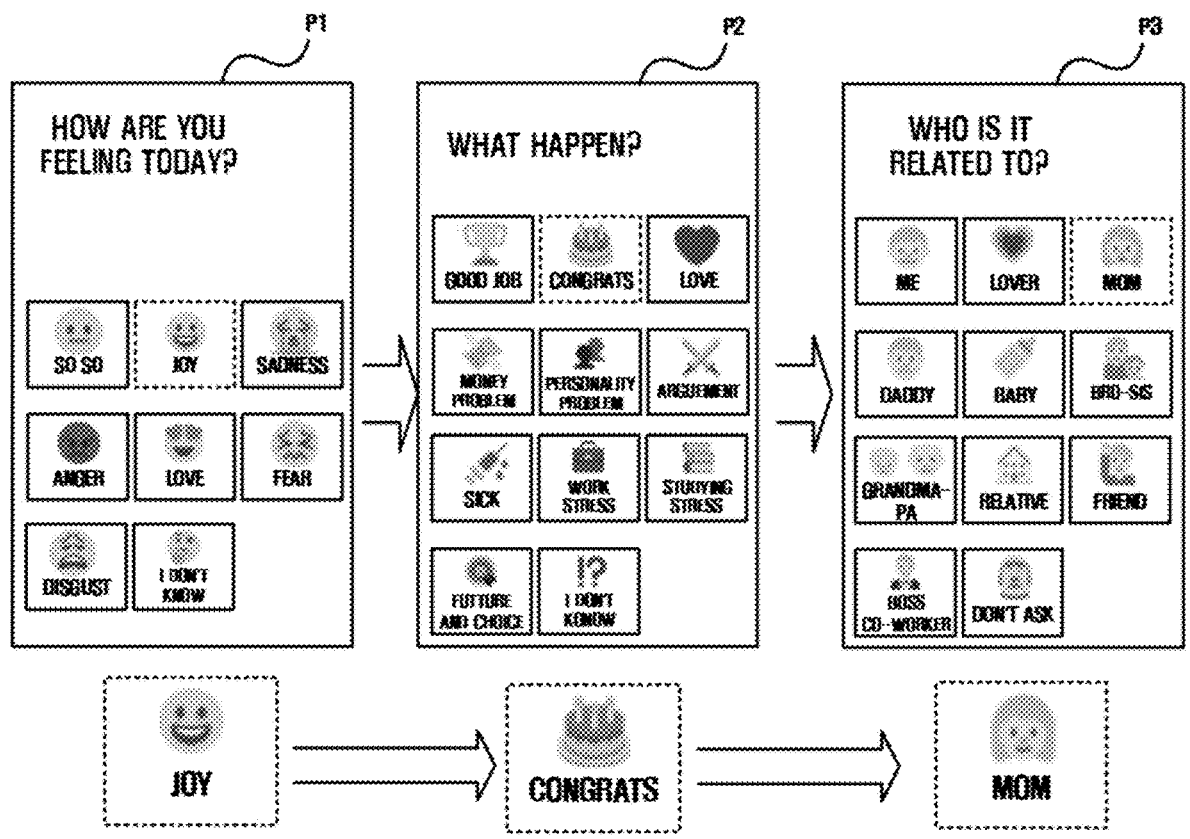
FIG. 4B is a view illustrating an example of selecting an emoticon grammar.
Figure 4C:
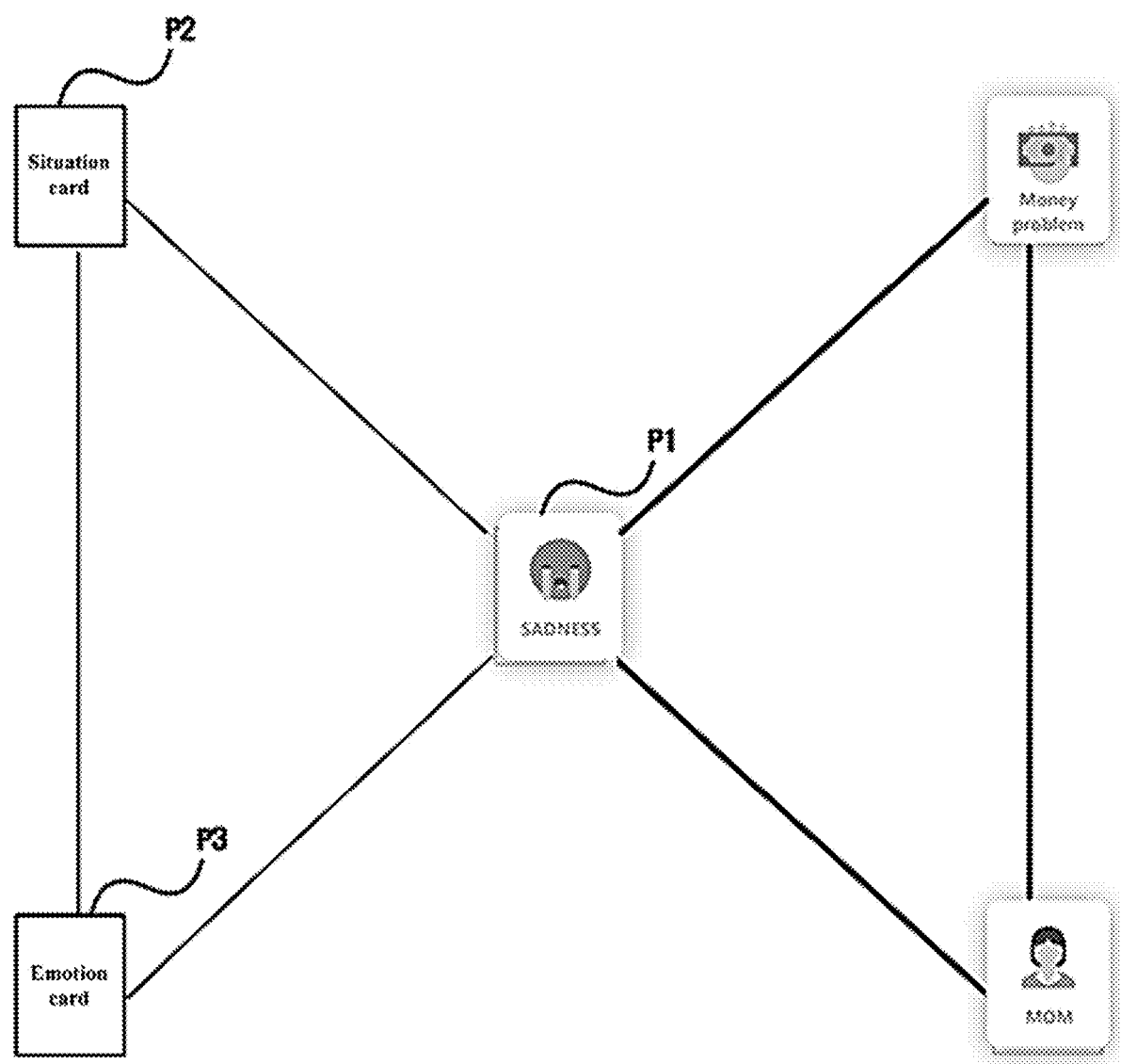
FIG. 4C is a view for describing a category in an emoticon grammar.

FIG. 4A is a view for describing a combination of emoticon grammars. FIG. 4B is a view illustrating an example of selecting an emoticon grammar. FIG. 4C is a view for describing a category in an emoticon grammar.

In the case of an English grammar, the intent of a natural language in the related art is analyzed in units of words and morphemes based on the structure of subject (S), verb (V), object (O) and complement (C).

In contrast, in an exemplary embodiment of the inventive concept, as illustrated in FIG. 4A, the emoticon grammar enables natural language communication through images such as emoticons P1 to P3. That is, the conversion to a complete natural language sentence is possible through the combination of emoticons; the emoticon combination itself becomes the emoticon grammar capable of converting a natural language.

The emoticon grammar is composed of the limited number of emoticons and categories P1 to P3 including all the emotions and the meanings of situations that the user is capable of expressing verbally. At this time, the emoticon grammar is preprocessed to be applied to a machine learning algorithm for emotion determination.

The related art may express a simple sentence, using an emoticon or emoji; however, the related art only converts one or two words of the natural language into emoticons or only infers the intent of the writer even though the sentence is created with only the combination of emoticons.

On the other hand, in an exemplary embodiment of the inventive concept, the emoticon grammar is for natural language processing and interpretation based on the image in which the language expression is abbreviated. Any user in the world may receive the shared contents as an appropriate answer only by selecting the emoticon grammar through the user terminal 200 regardless of the language of the user utilizing an image like an emoticon as the official language. Accordingly, the emoticon grammar may overcome the limitation of linguistic expressions, and it is possible to increase intuition and convenience through tagging.

According to an exemplary embodiment, the emoticon grammar may be classified into three semantic categories: an emotion category indicating the emotional state of a user, a situation category indicating a situation corresponding to an emotional state, and a relationship category indicating a person associated with the emotional state and the situation.

The emotion category includes an emoticon grammar that expresses the emotions of a user; the situation category includes an emoticon grammar that expresses the event situation that affects this emotion; the relationship category includes an emoticon grammar that expresses a person associated with this event.

In an exemplary embodiment of the inventive concept, it is possible to configure the natural language expression of the user through the combination of three semantic categories; the dictionary for grasping the intent for the natural language expression of the user is matched, and then the natural language sentence may be provided by analyzing the matched result.

The emoticon grammar composed of such the categories may be generated based on psychological counseling data and opinion poll data and may be composed of the combination of words having a range capable of being expressed by the user and representativeness.

The word included in each emoticon grammar may be used in the dictionary created for processing the natural language having the similar meaning; this operates as the centroid of the machine learning model that defines and classifies the character of a sentence.

For example, the emoticon grammar may be composed of the total of 30 that is the limited number. The emotion category may include eight emoticon grammars; the situation category may include eleven emoticon grammars; the relationship category may include eleven emoticon grammars According to the above-described example, when emoticon grammar is listed as words, the number of emotional expressions may be reduced to only 30 words.

In one embodiment, the emoticon grammar may be composed of only pictures indicating emotions, situations, or relationships and may be composed of at least one word indicating each of the emotions, the situations, or the relationships. Alternatively, as illustrated in FIG. 4B, the emoticon grammar may be composed of the combination of emotion categories P1 to P3.

The emoticon grammar for each category is adopted by applying the James-Lange emotion classification of modern psychology and item classification according to the ratio of recent psychological counseling answers. According to such the classification method, in an exemplary embodiment of the inventive concept, emotions in all the situations of a user may be expressed through emoticon grammars of about 10 sheets having representativeness in each category, that is, about 30 sheets.

Referring to FIG. 4C, the emotion category P1 is classified into the affirmation and negative of a sentence in accordance with the deformation of the above-mentioned emotion James-Ranke emotion classification.

Moreover, the situation category P2 is the largest category for identifying the main intent; the learning field of the natural language processing may be set and organized depending on the user's purpose. For example, in the case of the field of worry counseling, the situation category may be composed of people's concerns depending on the content of modern psychological counseling.

The relationship category P3 refers to a category that defines a situation, and the contents of the relationship category P3 vary depending on people's concerns. For example, the relationship that often appears in worry counseling associated with me may be used as the emoticon grammar.

The reception unit 110 may receive a selection input for at least one emoticon grammar included in each of the emotion category, the situation category, and the relationship category from the user terminal 200.

For example, for the purpose of expressing the daily routine, the user may select an emoticon grammar in order of emotion category-situation category-relationship category.

In the example of FIG. 4B, emoticon grammar "JOY-CONGRATS-MOM" is selected from the emoticon grammar of the emotion category-situation category-relationship category.

According to the abbreviated expression, there are only 968 combinations capable of expressing emotions, thereby increasing the number and accuracy of cases corresponding to the combination.

On the other hand, because it is difficult to identify the user's intent immediately with only three card combinations that is the basis of the determination, an exemplary embodiment of the inventive concept performs a step of identifying the user's intent to solve this problem.

In the meantime, the emoticon grammar may be expressed through weekly and monthly calendars; in this way, it is possible to identify the emotional state of the user at a glance, thereby utilizing the emoticon grammar as the basis for managing the user's mental state.

In addition, it is possible to identify the frequency of emotions for each period, the subject of worry, a current situation, or the like in the statistical methods through quotation sentences or free sentences to be described later.

The user intent analysis unit 120 analyzes the user's intent based on the emoticon grammar received by the reception unit 110.

At this time, an exemplary embodiment of the inventive concept may analyze the user's intent, using a dictionary for converting the emoticon grammar selected by the user into a natural language.

In an exemplary embodiment of the inventive concept, as described above, the minimum unit of the sentence on which the user's emotion expression is projected is set to emotion-situation-relationship, and then the user's intent may be analyzed through the machine learning model, using the structure. In an exemplary embodiment of the inventive concept, such the machine learning model is referred to as "Soul Communication Map Model".

Soul Communication Map Model is a model that determines the user's intent (or emotion) with three pivotal words and then derives the answer thereto. In this model, a sentence is tagged through a virtual dialogue simulation in advance, and the optimal answer may be derived by learning the tagged sentence.

At this time, the inventive concept does not promptly convert the emoticon grammar to a one-to-one word or search for a synonym. When the sentence including ambiguity implied in words or similar phonological ambiguity is partly excerpted, the ambiguity due to the omission of an object and the complexity due to the problem of finding an answer may increase.

In an exemplary embodiment, the user intent analysis unit 120 may analyze the user's intent by extracting a hypothetical case from the emoticon grammar received by the reception unit 110.

At this time, the hypothetical case may use a case dictionary prepared in advance. According to an exemplary embodiment of the inventive concept, an emoticon grammar may be converted into a sentence indicating the user's intent by using a dictionary to generate a kind of hypothetical conversation situation and to identify the intent of the conversation.

First of all, as illustrated in FIG. 4C, the user intent analysis unit 120 determines whether the emotion is positive or negative, from the emoticon grammar selected from the emotion category. That is, an exemplary embodiment of the inventive concept, whether the emotion is positive or negative is primarily determined to remove the ambiguity in representation of an image.

For example, the number of hypothetical cases capable of being generated through the words "money" and "son or daughter" is infinite. "Son or daughter got paid and gave me pocket money" and "son or daughter does not have enough money to pay college tuition" are included in a hypothetical case capable of being generated from both words without the determination of the positive and negative. Accordingly, it is need to determine, in advance, whether the emotion is positive or negative from the emotional expression image.

Then, the user intent analysis unit 120 extracts a hypothetical situation corresponding to the situation from the emoticon grammar selected from the situation category based on the result of the determination of the positive or negative. For example, when the situation category is a money problem, it is possible to extract 'debt, school expenses, monthly salaries, real estate, and loans' through multiple hypothetical situations.

Next, the user intent analysis unit 120 extracts a hypothetical case by additionally applying the emoticon grammar selected from the relationship category to the extracted hypothetical situation.

In the above example, it is possible to extract 'son or daughter educational expenses problems' and 'son or daughter marriage expenses problem' as a hypothetical case by adding the relationship of 'son or daughter' to the situation of 'money problem'. This relationship category plays a role of assigning a weight for identifying the intent to the hypothetical situation.

In this case, the user intent analysis unit 120 may include a plurality of hypothetical cases that are matched for each of the selected combination of emoticon grammars.

Figure 5:
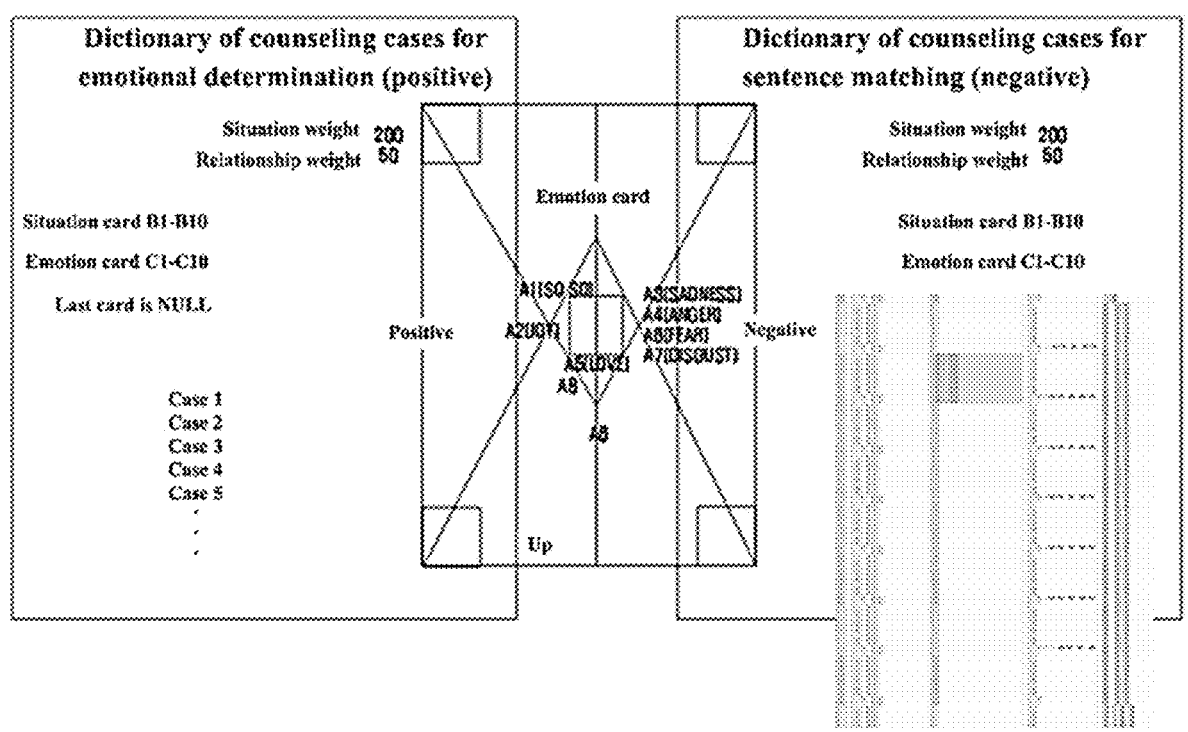
FIG. 5 is a view for describing an answer dictionary in an exemplary embodiment of the inventive concept.

FIG. 5 is a view for describing an answer dictionary in an exemplary embodiment of the inventive concept.

For example, referring to FIG. 5, when three emoticon grammars are selected from 30 emoticon grammars A1 to A8, B1 to B10, and C1 to C10, the number of cases capable of being expressed by a user is 968 cases. Five to ten case sentences may be matched for each of 968 combinations, and then the matched result may be placed as an answer dictionary. Accordingly, about 9000 expressions may be prepared as answer dictionaries, which may answer almost any question in the field of worry consultation.

The quotation sentence matching unit 130 matches a plurality of quotation sentences depending on the analyzed intent of the user.

Afterward, when the reception unit 110 receives a selection input for the predetermined number of quotation sentences from the user terminal 200, the shared content generation unit 140 generates shared contents by tagging the received quotation sentence with an emoticon grammar.

Figure 6:
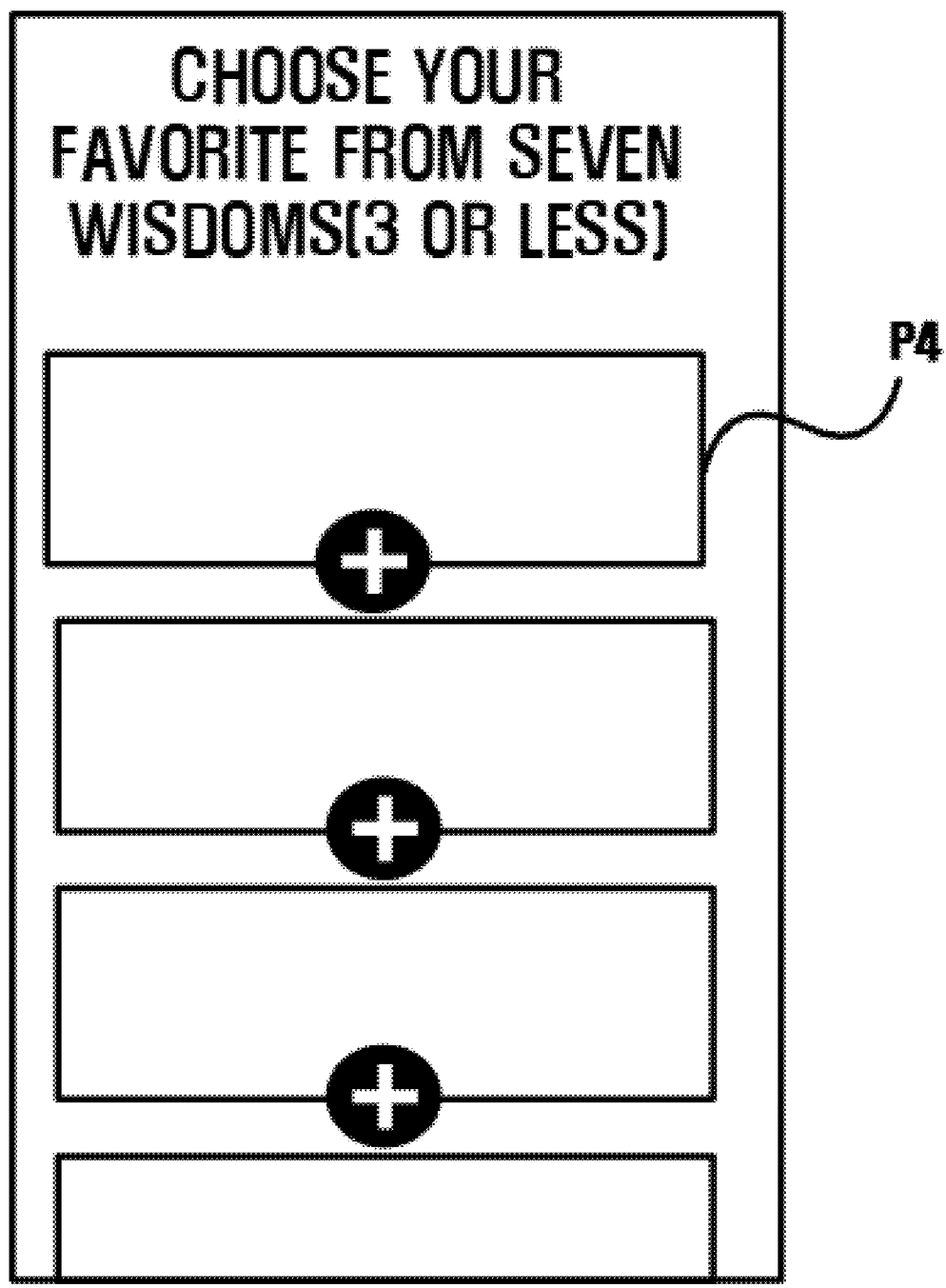
FIG. 6 is a diagram for describing an example of selecting the predetermined number of quotation sentences.

FIG. 6 is a diagram for describing an example of selecting the predetermined number of quotation sentences P4.

The quotation sentence used in an exemplary embodiment of the inventive concept is composed of sentences of the pressed, official, published book, the famous saying of a celebrity, and the well-known sentences of the movie.

It is different for the related art, for example, the conventional chatbot system to have a deep conversation with a user; the reason is that the language expression ability is different for each user; as a result, it is impossible to have a conversation with unspecified users at a specific level.

This reason is that the communication method is based on a rule system that analyzes words themselves or stores existing conversations and then matches the conversations in the auto-responsive manner. The basic configuration of this rule method is mostly input data matched with the characteristics of the developer or conversations performed on the existing web; the performance of this method may be improved in the case of free answers, but it was difficult to identify the intent or emotion of a user and to respond to the user's intent or emotion in depth.

On the other hand, in an exemplary embodiment of the inventive concept, it is possible to match a plurality of quotation sentences P4 depending on the analyzed intent of the user. At this time, the quotation sentence used in the exemplary embodiment of the inventive concept is primarily refined in that the quotation sentence is the result of a medium passed the deliberation of each country. Secondly, it is possible to provide each user with a considerable level of in-depth response results in that the quotation sentence is provided to other users based on the tagging of the user that expresses emotions.

In an exemplary embodiment, even though the quotation sentence is the result of the medium primarily passed the deliberation, the quotation sentence used in the inventive concept may be filtered depending on the condition predetermined by an administrator or a user. At this time, the predetermined condition may be, for example, filtering words such as words of political expressions, words inappropriate to be disclosed to adolescents, or the like.

In an exemplary embodiment of the inventive concept, for the purpose of searching for such the quotation sentence, it is possible to apply a method of increasing the score to which the meaning according to the user's tagging is assigned, to the language ambiguity.

To this end, first of all, it is possible to generate an emotion communication map including all the situation structures capable of being expressed by the user as a representative word in a survey. Next, the words of the sentence are analyzed depending on the emotion communication map. The final step may be a step in which the user chooses and learns results in the ambiguous state as the response to the expression of emotion; as the number of users increases through the result of choosing the user's sentence and the number of quotation sentences tagged with emotion expression images increases, the user may provide the optimized answers.

For example, about 8,000 quotation sentences may be prepared in advance. Sources of the corresponding quotation sentences are composed of about 200 films and about 5,000 books and the languages of the source include Spanish, German, Japanese, Chinese, English, Korean, Swahili, French, and the like At this time, when the quotation sentence in a book or a movie is used as a source, the corresponding quotation sentence may have ambiguity because there is no description of the situation and there are a lot of intermediate excerpts. On the other hand, thanks to such the ambiguity, it may be possible to give the room for interpretation to a person listening to an answer, that is, another user, with which the shared contents are shared, and to give meanings.

According to this example, as illustrated in FIG. 6, the quotation sentence matching unit 130 matches seven quotation sentences P4 among about 8,000 quotation sentences to provide the matched result to the user terminal 200; when the user selects three out of these quotation sentences, the shared content generation unit 140 generates the shared contents by tagging three emoticon grammars with the selected three quotation sentences.

In the above example, three quotation sentences are selected from 8,000 quotation sentences. 85,301,336,000 answers, that is, about 85.2 billion answers to emotion expression images may be made through this combination.

That is, in an exemplary embodiment of the inventive concept, as the unspecified number of users utilize the service, it is possible to build a data set for psychoanalysis through the emoticon grammar in the emotion-situation-relationship category selected by the users and the quotation sentence tagged with the emoticon grammar; it is possible to build an extensible answer dictionary for the user's emotions based on the data set.

In other words, in an exemplary embodiment of the inventive concept, it is possible to build the answer dictionary at the same time as the service of the user is utilized.

Such the answer dictionary may be shared with unspecified users depending on specific conditions in the form of the shared contents described later.

In particular, in an exemplary embodiment of the inventive concept, the quotation sentence is shared with each of the users based on the emoticon grammar and is capable of being shared regardless of languages; in an exemplary embodiment of the inventive concept, international expansion is possible infinitely beyond language barriers.

Next, the shared content provision unit 150 provides the generated shared contents to the user terminal 200 or the other user terminal 300 for sharing the generated shared contents.

At this time, the tagged shared contents may be classified and stored for each user.

The quotation sentences tagged with the emoticon grammar may be redistributed with high probability to other users who choose the same emoticon grammar, through the learning process.

For example, the shared content provision unit 150 may search for the other user terminal 300 that chooses the same emoticon grammar as the received emoticon grammar and may provide the found other user terminal 300 with the quotation sentence tagged with the emoticon grammar.

In an exemplary embodiment, when there are a plurality of other user terminals 300, the shared content provision unit 150 may first provide the quotation sentence tagged with the other user terminal 300 using the same language.

In contrast, in the case of the other user terminal 300 using a different language, it is possible to provide the translation of the quotation sentence corresponding to the corresponding language, by searching the quotation sentence in a pre-stored database or through online search. When not found, the quotation sentence is regarded as a free expression and is provided to the other user terminal 300 clustered to be described later through automatic translation.

Figure 7:
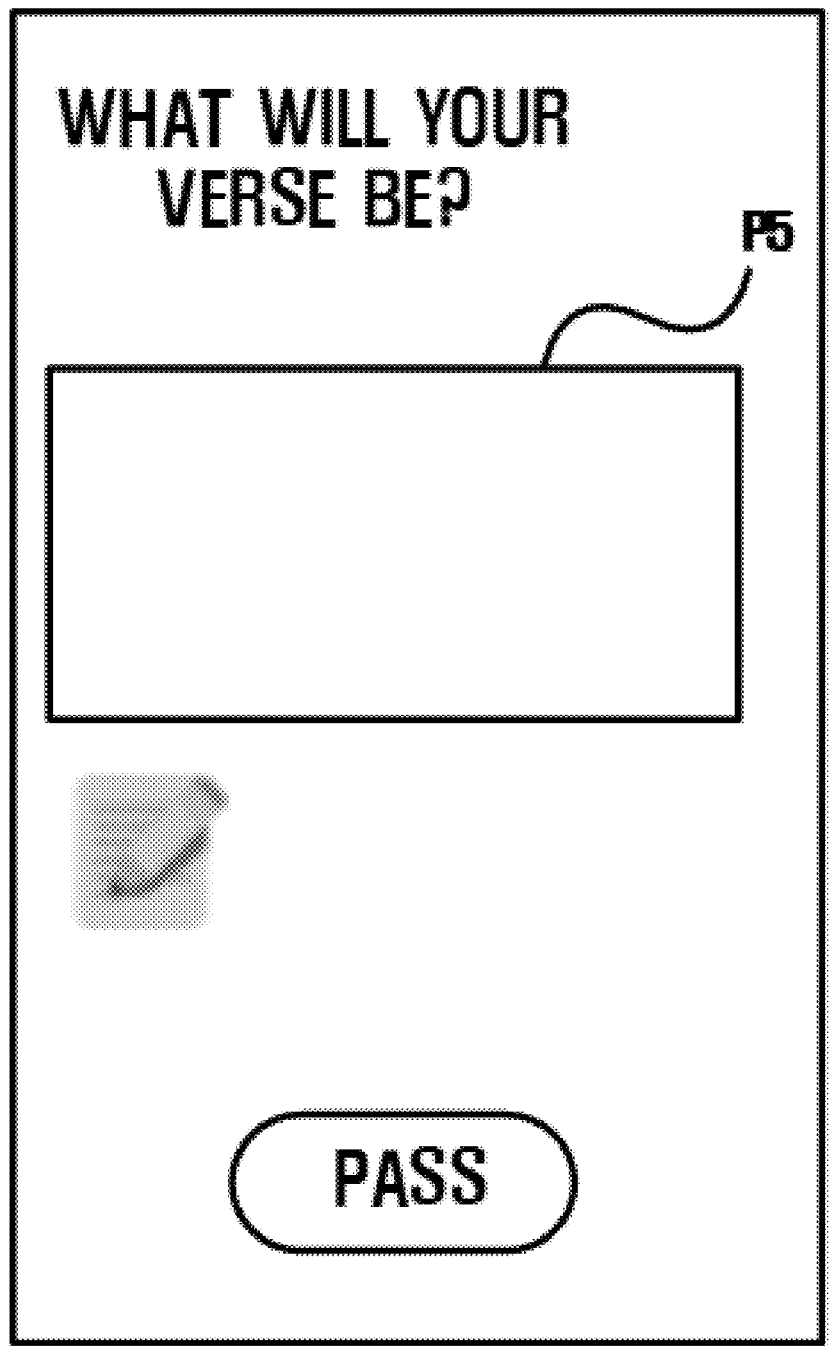
FIG. 7 is a view for describing an example of entering a free sentence.

FIG. 7 is a view for describing an example of entering a free sentence P5.

In the meantime, in an exemplary embodiment of the inventive concept, it is possible to generate shared contents such that the free sentence P5 freely written by a user in response to the emoticon grammar is included, in addition to allowing the user to select the quotation sentence P4 such that shared contents are generated.

That is, when the reception unit 110 receives an input for the free sentence P5 corresponding to the emoticon grammar selected from the user terminal 200, the shared content generation unit 140 may generate shared contents by tagging the free sentence P5 with the emoticon grammar.

At this time, the free sentence written by the user is tagged with the emoticon grammar and is stored in the database; the free sentence may be shared with other users later, depending on whether the user agrees to disclose the free sentence.

In one embodiment, for the purpose of sharing the shared contents including the free sentence with the other user terminal 300, the shared content provision unit 150 may cluster the other user terminal 300 that selects the same emoticon grammar as the emoticon grammar the predetermined number of times or more and may provide the clustered other user terminal 300 with the free sentence tagged with the emoticon grammar.

Herein, the clustered the other user terminal 300 is the other user terminal 300 that not only selects the same emoticon grammar but also selects the same quotation sentence among a plurality of quotation sentences the predetermined number of times or more.

As such, in an exemplary embodiment of the inventive concept, the user may select and learn the result in an ambiguous state that is called the answer to emotion expression; accordingly, as the number of users increases and the number of tagged free sentences increases, more efficient answers may be provided to each user.

Figure 8:
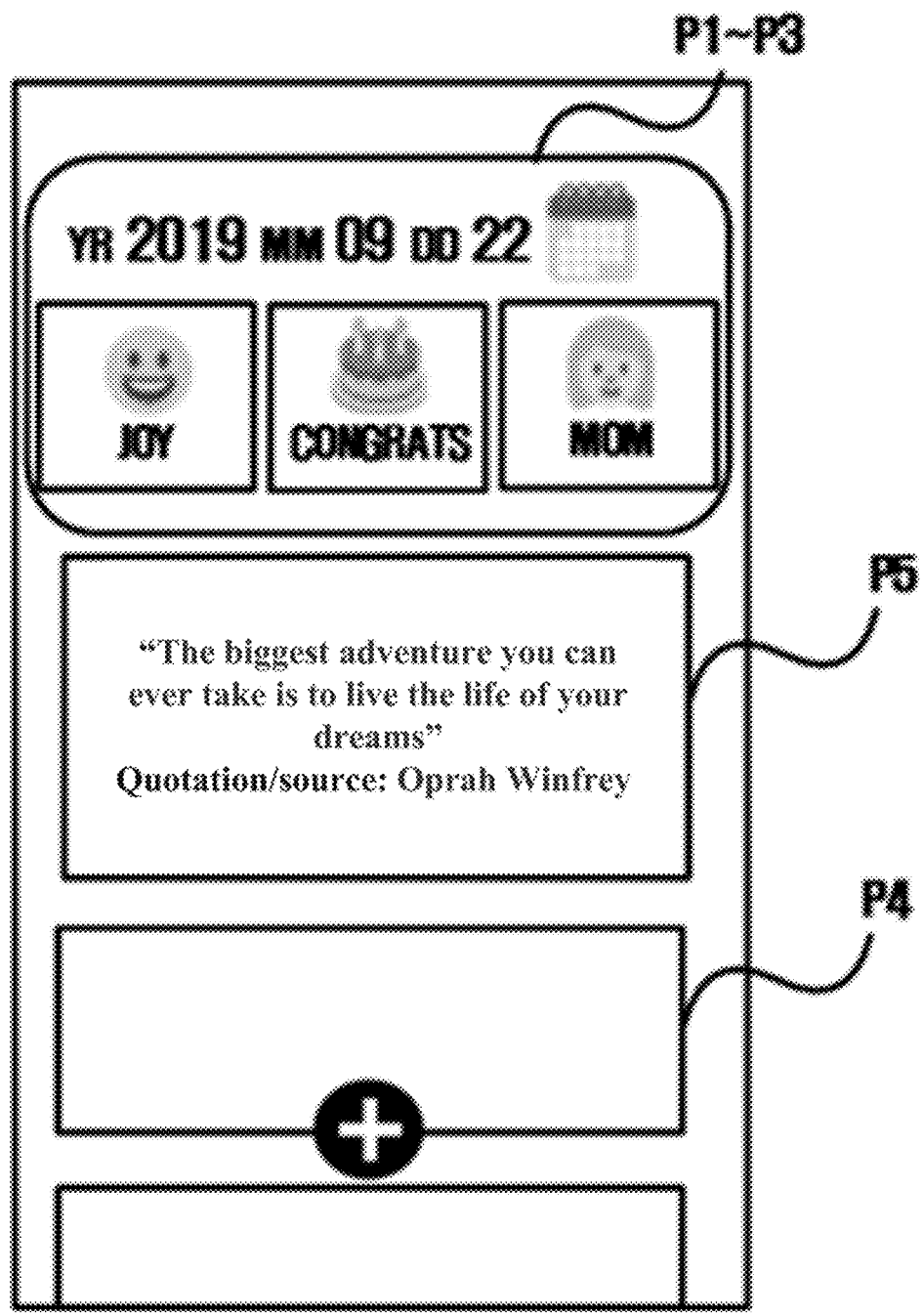
FIG. 8 is a view for describing an example of shared contents.

FIG. 8 is a view for describing an example of shared contents.

The shared contents generated through the above process may be composed of the predetermined number of emoticon grammars P1 to P3, the predetermined number of quotation sentences P4 tagged with the emoticon grammars P1 to P3, and the free sentence P5 written depending on the user's choice.

In the example of FIG. 8, the user selects "JOY-CONGRATS-MOM" as an emoticon grammar for the emotion category-situation category-relationship category in FIG. 4B.

As the shared contents are completed, the shared contents are provided to the user terminal 200 by default. Moreover, the shared contents may be provided such that the same quotation sentence is included in the other user terminal (300) selecting the same emoticon grammar many times among the unspecified number of other user terminals 300, depending on whether the consent of the user is present; the shared contents may be provided such that the free sentence is included together.

As such, an exemplary embodiment of the inventive concept has a structure in which a user may collect the data set for psychoanalysis at the same time while using the service and in which the shared contents being the answer dictionary generated by each of the users are shared based on the collected data set. In an exemplary embodiment of the inventive concept, users utilize the shared content through this structure, regardless of the environment of each country.

Hereinafter, a method performed by the shared content providing apparatus 100 according to an exemplary embodiment of the inventive concept will be described with reference to FIG. 9.

Figure 9:
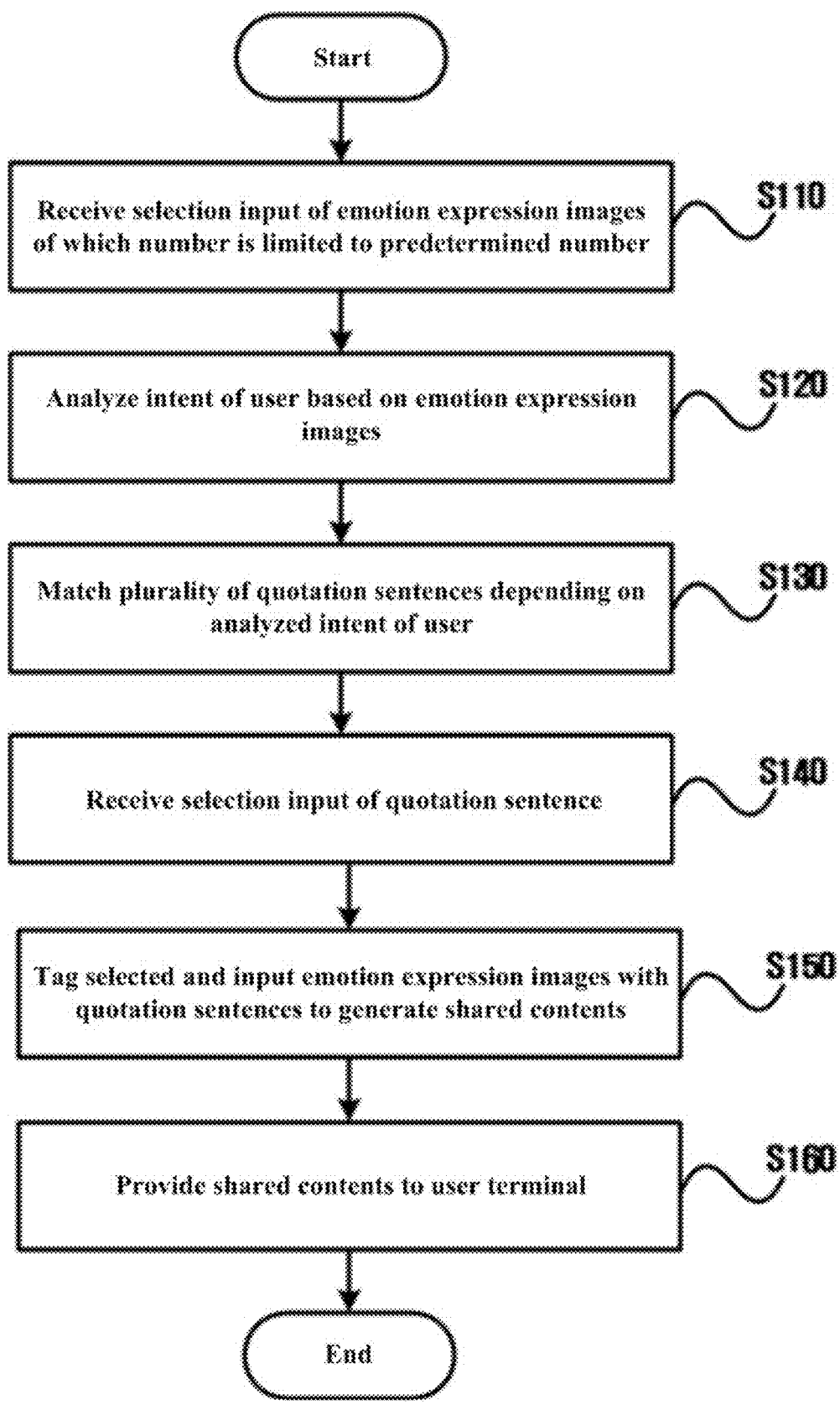
FIG. 9 is a flowchart of a method of providing shared contents, according to an exemplary embodiment of the inventive concept.

FIG. 9 is a flowchart of a method of providing shared contents, according to an exemplary embodiment of the inventive concept.

First of all, in operation S110, a selection input for the predetermined number of emoticon grammars among emoticon grammars, of which the number is limited to the predetermined number, is received from the user terminal 200.

Next, the intent of the user is analyzed based on the received emoticon grammars in operation S120; a plurality of quotation sentences are matched depending on the analyzed intent of the user in operation S130.

Next, the selection input for the predetermined number of quotation sentences is receive in operation S140; the received emoticon grammars are tagged with the quotation sentences to generate shared contents in operation S150; the generated shared contents are provided to the user terminal 200 in operation S160.

In the meantime, in the above description, operation S110 to operation S160 may be further divided into additional operations or may be combined into fewer operations, according to an exemplary embodiment of the inventive concept. In addition, some operations may be omitted as necessary, and the order between operations may be changed. Furthermore, although omitted, the contents of FIGS. 1 to 8 may be also applied to the shared contents providing method of FIG. 9.

The shared content providing method according to an exemplary embodiment of the inventive concept may be implemented by a program (or an application) and may be stored in a medium such that the program is executed in combination with a computer being hardware.

In some embodiments, the above-discussed method of FIG. 9, according to this disclosure, is implemented in the form of program being readable through a variety of computer means and be recorded in any non-transitory computer-readable medium. Here, this medium, in some embodiments, contains, alone or in combination, program instructions, data files, data structures, and the like. These program instructions recorded in the medium are, in some embodiments, specially designed and constructed for this disclosure or known to persons in the field of computer software. For example, the medium includes hardware devices specially configured to store and execute program instructions, including magnetic media such as a hard disk, a floppy disk and a magnetic tape, optical media such as CD-ROM (Compact Disk Read Only Memory) and DVD (Digital Video Disk), magneto-optical media such as floptical disk, ROM, RAM (Random Access Memory), and flash memory. Program instructions include, in some embodiments, machine language codes made by a compiler compiler and high-level language codes executable in a computer using an interpreter or the like. These hardware devices are, in some embodiments, configured to operating as one or more of software to perform the operation of this disclosure, and vice versa.

A computer program (also known as a program, software, software application, script, or code) for the above-discussed method of FIG. 9 according to this disclosure is, in some embodiments, written in a programming language, including compiled or interpreted languages, or declarative or procedural languages. A computer program includes, in some embodiments, a unit suitable for use in a computing environment, including as a stand-alone program, a module, a component, or a subroutine. A computer program is or is not, in some embodiments, correspond to a file in a file system. A program is, in some embodiments, stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program is, in some embodiments, deployed to be executed on one or more computer processors located locally at one site or distributed across multiple remote sites and interconnected by a communication network.

According to an exemplary embodiment of the inventive concept, it is possible not only to allow a user to express emotions but also to provide shared contents capable of releasing emotions by providing the answer to emotional expressions.

Furthermore, the shared contents are completed through three or four touches instead of writing a sentence. Accordingly, it is possible to overcome the limitation of the app function of a smartphone in which short texts are usually written.

In addition, it is possible to solve the problem of indiscriminately collecting personal information by expressing the emotion of the user with an emoticon grammar being the abbreviated image; it is possible to communicate between users of different languages through emoticon grammar patterns and translations of quotation sentences.

Although the exemplary embodiments of the inventive concept have been described with reference to the accompanying drawings, it will be understood by those skilled in the art to which the inventive concept pertains that the inventive concept can be carried out in other detailed forms without changing the technical spirits and essential features thereof. Therefore, the above-described embodiments are exemplary in all aspects, and should be construed not to be restrictive.

What is claimed is:

1. An apparatus automatically generating and providing shared contents through a sentence matched based on an emoticon grammar for natural language processing and interpretation, the apparatus comprising:
   a memory configured to store a program for generating and providing the shared contents; and
   a processor configured to automatically generate and provide the shared contents through the sentence matched based on the emoticon grammar, through execution of the program stored in the memory,
   wherein the processor is configured to:
   receive, from a first user terminal, a selection input for a predetermined number of emoticon grammars, among a limited number of emoticon grammars;
   analyze an intent of a user based on the received selection input for the predetermined number of the emoticon grammars by using a machine learning model that determines the intent of the user with three pivotal words and then derives an answer thereto, wherein in the machine learning model, a sentence is tagged through a virtual dialogue simulation in advance, and an optimal answer is derived by learning the tagged sentence;
   match a plurality of quotation sentences with the analyzed intent of the user;
   receive a selection input for a predetermined number of the plurality of quotation sentences matched with the analyzed intent of the user;
   tag the predetermined number of the emoticon grammars corresponding to the received selection input for the predetermined number of the emoticon grammars with the predetermined number of the plurality of quotation sentences corresponding to the received selection input for the predetermined number of the plurality of quotation sentences, to generate the shared contents; and
   transmit the shared contents to the first user terminal,
   wherein the tagged shared contents are separated and stored for each user, and
   wherein the processor is further configured to:
   search for user terminals selecting the emoticon grammar that is the same as at least one emoticon grammar included in the predetermined number of the emoticon grammars, to transmit a quotation sentence tagged with the at least one emoticon grammar included in the predetermined number of the emoticon grammars;
   transmit the quotation sentence to a second user terminal using same language as language of the quotation sentence, among the searched user terminals; and
   after the transmission of the quotation sentence to the second user terminal, perform an automatic translation of the quotation sentence to different language from the language of the quotation sentence and transmit a translated quotation sentence to a third user terminal using the different language, among the searched user terminals.

2. The apparatus of claim 1, wherein the processor is further configured to receive an input for a free sentence corresponding to at least one emoticon grammar included in the predetermined number of the emoticon grammars from the first user terminal, and tag the free sentence with the at least one emoticon grammar included in the predetermined number of the emoticon grammars to generate the shared contents.

3. The apparatus of claim 2, wherein the processor is further configured to cluster fourth user terminals each of which is selecting the emoticon grammar the same as at least one emoticon grammar included in the predetermined number of the emoticon grammars and provides the free sentence tagged with the emoticon grammar to the clustered fourth user terminals.

4. The apparatus of claim 3, wherein each of the clustered fourth user terminals is a fourth user terminal selecting the quotation sentence.

5. The apparatus of claim 1, wherein the emoticon grammars are classified and provided into an emotion category indicating an emotion state of the user, a situation category indicating a situation corresponding to the emotion state, and a relationship category indicating a person associated with the emotion state and the situation.

6. The apparatus of claim 5, wherein the processor is further configured to receive a selection input for an emotion expression image included in each of the emotion category, the situation category, and the relationship category, from the first user terminal.

7. The apparatus of claim 6, wherein the processor extracts a hypothetical case from at least one emoticon grammar included in the predetermined number of the emoticon grammars, to analyze the intent of the user.

8. The apparatus of claim 7, wherein the processor determines whether an emotion is positive or negative, from the emoticon grammar selected from the emotion category, extracts a hypothetical situation corresponding to a situation from the emoticon grammar selected from the situation category based on the determined result, and extracts the hypothetical case by additionally applying the emoticon grammar selected from the relationship category to the extracted hypothetical situation.

9. The apparatus of claim 8, wherein the processor includes a plurality of hypothetical cases respectively matched with selection combinations of the emoticon grammar.

10. A method of automatically generating and providing shared contents through a sentence matched based on an emoticon grammar for natural language processing and interpretation and performed by a shared content providing apparatus, the method comprising:

receiving, from a first user terminal, by a processor configured to automatically generate and provide the shared contents through the sentence matched based on the emoticon grammar, a selection input for a predetermined number of emoticon grammars, among a limited number of emoticon grammars;

analyzing, by the processor, an intent of a user based on the received selection input for the predetermined number of the emoticon grammars by using a machine learning model that determines the intent of the user with three pivotal words and then derives an answer thereto, wherein in the machine learning model, a sentence is tagged through a virtual dialogue simulation in advance, and an optimal answer is derived by learning the tagged sentence;

matching, by the processor, a plurality of quotation sentences with the analyzed intent of the user;

receiving, by the processor, a selection input for a predetermined number of the plurality of quotation sentences matched with the analyzed intent of the user;

tagging, by the processor, the predetermined number of the emoticon grammars corresponding to the received selection input for the predetermined number of the emoticon grammars with the predetermined number of the plurality of quotation sentences corresponding to the received selection input for the predetermined number of the plurality of quotation sentences, to generate the shared contents; and transmitting, by the processor, the shared contents to the first user terminal, wherein the tagged shared contents are separated and stored for each user, and wherein the transmitting further comprises:
searching for user terminals selecting the emoticon grammar that is the same as at least one emoticon grammar included in the predetermined number of the emoticon grammars, to transmit a quotation sentence tagged with the at least one emoticon grammar included in the predetermined number of the emoticon grammars;

transmitting the quotation sentence to a second user terminal using same language as language of the quotation sentence, among the searched user terminals; and after the transmission of the quotation sentence to the second user terminal, performing an automatic translation of the quotation sentence to different language from the language of the quotation sentence and transmitting a translated quotation sentence to a third user terminal using the different language, among the searched user terminals.

* * * * *